(12) United States Patent
Freiburger et al.

(10) Patent No.: US 7,835,125 B2
(45) Date of Patent: Nov. 16, 2010

(54) CIRCUIT FOR SAFE FORWARDING OF AN ANALOG SIGNAL VALUE

(75) Inventors: Ewald Freiburger, Neulingen (DE); Jürgen Briggmann, Stuttgart (DE)

(73) Assignee: Berthold Technologies GmbH & Co. KG, Bad Wildbad (DE)

( * ) Notice: Subject to any disclaimer, the term of this patent is extended or adjusted under 35 U.S.C. 154(b) by 806 days.

(21) Appl. No.: 11/753,151

(22) Filed: May 24, 2007

(65) Prior Publication Data

US 2008/0007307 A1 Jan. 10, 2008

(30) Foreign Application Priority Data

May 24, 2006 (DE) ........................ 10 2006 024 311

(51) Int. Cl.
*H02H 7/00* (2006.01)
(52) U.S. Cl. ..................................... 361/93.1
(58) Field of Classification Search ................. 361/93.1
See application file for complete search history.

(56) References Cited

U.S. PATENT DOCUMENTS 7,072,159 B2 * 7/2006 Mercier ........................ 361/58
7,460,025 B2 * 12/2008 Mellert et al. ............. 340/693.7

FOREIGN PATENT DOCUMENTS

EP 1 122 625 A1 8/2001

WO 2005/104056 A2 11/2005

OTHER PUBLICATIONS

European Search Report mailed Jul. 1, 2008.

* cited by examiner

*Primary Examiner*—Stephen W Jackson
(74) *Attorney, Agent, or Firm*—Browdy and Neimark, PLLC

(57) ABSTRACT

In a circuit for safe forwarding of a physical or technical variable between at least two systems in communication with one another, which variable is represented by the value of a loop current (Is), which is adjusted by a control unit (11) by means of a current output circuit (13) in a current loop (20, 60), the current output circuit (13) has at least two parallel-connected final control elements (131, 132), controllable by the control circuit (11), as current sources for mutually independent adjustment of a value of the loop current (Is). The final control elements (131, 132) are in series with at least two likewise series-connected measurement resistors (133a, 133b). The voltage, proportional to the loop current (Is), dropping via at least one but not all of the at least two measurement resistors is fed back to the control unit (11), which compares the value of this voltage with the corresponding value of the loop current, which value is specified to at least one of the final control elements, and in the event of deviations, via a predeterminable threshold, allocates an fault value corresponding to the NAMUR recommendation NE043 to the loop current via the first final control element (131), and in the case of failure of the first final control element (131) via the second final control element (132). A monitoring circuit (17) is provided, which in the event of failure of the control unit (11) allocates an fault value that likewise corresponds to the NAMUR recommendation NE043 to the loop current via the second final control element (132).

6 Claims, 10 Drawing Sheets

CIRCUIT FOR SAFE FORWARDING OF AN ANALOG SIGNAL VALUE

BACKGROUND OF THE INVENTION

The invention relates to an electronic circuit for safe forwarding of an analog electrical signal value (hereinafter called simply signal for short) between two or more systems communicating with one another. The signal may for instance be the representation of a physical variable (such as pressure, temperature, brightness, conductivity, etc.) or a technical variable (such as fill level, flow rate, set-point or actual values of a controlling value or closed control loop, etc.). The conversion of the physical or technical variable (hereinafter called variable for short) into a signal representing it is done by sensor or detector systems (hereinafter called transmitters for short) on-site, at the place ("in the field") where the variable is to be detected or ascertained (the terms field devices or field transmitters are therefore often also used). The signal thus ascertained is then made available for further processing to other systems, sometimes even quite far away (displays, closed-loop control systems, open-loop controllers, motors, valves, and so forth, hereinafter called evaluation systems for short).

Manifold demands are made in terms of the performance and operating safety of such systems; some of these have been written down in the form of standards. These demands will be sketched out briefly below:

Current signal per NAMUR:

One standard that is widely used in industry for forwarding signals of physical or technical variables is an electrical current loop in accordance with NAMUR recommendations NE006 (or DIN IEC 60381, Part 1) and NE043 (NAMUR is an international association of users of automation technology in the processing industry). In it, an electrical loop current of between 4 mA and 20 mA flowing in a current loop represents the value of the physical or technical variable. Because of drifting and imprecision and the detection of regional overflows, a somewhat greater current range is permitted for representing the variables: 3.8 . . . 20.5 mA. Currents of less than 3.6 mA or greater than 21 mA should no longer be interpreted by the evaluation units as representing the physical or technical variable but rather as erroneous information from the sensor. A loop current of less than 3.6 mA or greater than 21 mA will therefore hereinafter briefly be called an fault current.

Field devices that have a current requirement of only less than 3.6 mA are often supplied with energy from the current loop itself. In that case, the term 2-conductor devices is used, since for connecting the devices, a line with only two wires is needed. The associated counterpart (evaluation system) must in this case make a suitable electrical power supply available for supplying the current loop. The field device in this case functions as a passive current sink.

Field devices with higher current consumption must be supplied with additional auxiliary energy (3-conductor or 4-conductor devices). Besides the operating mode as a current sink (as in the case of 2-conductor devices), however, these devices can also act as an active current source. The electrical power supply of the current loop is then accommodated in the field device itself. The advantage here is that the connection to the evaluation systems can be done more simply (an electrical power supply is no longer necessary).

HART Protocol:

A purely analog electrical current signal cannot ever be used for more than transmitting a variable in one direction (for instance from the transmitter to the evaluation device). In many cases, however, it is desirable to transmit still further additional information, and the information flow of additional information should be possible in both directions. Such additional information includes for instance information on inspection conditions of the sensor, internal states of the sensor (such as temperature, operating voltage, etc.), calibration and parametrizing information of the sensor, and so forth. One widely used method for transmitting such additional information is to superimpose an FSK (Frequency Shift Keying, Bell Standard 202) on digital electrical information via the actual analog electrical signal. To that end, a higher-frequency signal is therefore superimposed on the low-frequency (quasi-steady-state) current signal with an upper 3 dB limit frequency of 25 Hz and can be sampled back and forth between the frequencies of 1200 Hz (representing a "0") and 2200 Hz (representing a "1"). The mean value of the low-frequency analog current signal remains unchanged. So that field devices and evaluation systems from different manufacturers can exchange this additional information with one another, a uniform protocol for information exchange has been defined: the HART protocol (HART=Highway Addressable Remote Transducer), which is administered as a public protocol by the HCF (HART Communication Foundation), and in which certain minimum demands in terms of the (hardware) quality of the signals are also firmly defined.

Explosion Protection by Intrinsic Safety:

Particularly in the processing industry, physical or technical variables must often be measured or ascertained in areas where there is a potential risk of explosion. By suitable provisions in the field devices and evaluation systems (such as voltage and current limitation), the electrical energy in the signal to be forwarded can be limited in such a way that this signal cannot trip an explosion under any circumstances (short circuit, interruptions, thermal effects, etc.). In this case, the term used is intrinsically safe signals under DIN EN 50020 or IEC 60079-11).

Functional Safety:

In many cases, the magnitude of the forwarded signal can have a substantial influence on safety-relevant decisions (such as temperature, pressure or fill level in a chemical process to be regulated that involves highly toxic, explosive, or otherwise dangerous initial or final products). In these cases, for the safe running of the process it is decisive that the forwarded signal actually correspond to the measurement variable. Devices and systems in safety-relevant applications must therefore meet special demands, which are written and defined among other places in the series of Functional Safety Standards (DIN EN 61508 and DIN IEC 61511). A central component of these standards is the classification of devices and systems with regard to their so-called Safety Integrity Level (SIL). Depending on the magnitude of the danger in a system, the devices and systems used there must have an SIL of from 1 (little danger) to 4 (extreme danger). Limit values for the failure rates and the reliability of the devices used in such systems are linked directly to the SIL.

Since evaluation systems (control systems, controllers, etc.) can know only the forwarded signals but not the associated variables to be measured, in safety-relevant applications they must depend on very high reliability of the signals, or else additional signals must be used to determine the correctness. Often in such cases, the variables to be measured are detected and transmitted in redundant fashion (two or more transmitters, each with their own signals). Then the evaluation systems, by comparison of the forwarded signals (for instance for agreement within predetermined limits), can determine the correctness of the signals. A disadvantage here is the considerable additional hardware expense (multiple transmitters, multiple signal lines, comparison devices, and so forth) as well as the increase in complexity of the evaluation (for instance, by how much may the signals be allowed to deviate from one another and still be considered to be the same?).

The only device in a current loop that can determine the agreement of the current flowing in the current loop with the physical or technical variable to be represented is the transmitter itself, since only to that transmitter are both values known. It is therefore advantageous if a transmitter can ascertain the agreement of the current signal with the variable to be represented with adequately high probability, and in the event of a deviation of the current signal can safely put it into one of the two fault states (<3.6 mA or >21 mA, per NAMUR).

PRIOR ART

From International Patent Disclosure WO 2005/052881 A2, a monitoring device is known with which the demands described above can be partly met. A disadvantage of this embodiment, however, is considered to be that the measurement resistor provided there is not itself monitored for fault, so that a fault function of it goes undetected for correct functioning of the essential component, and consequently increased demands for functional safety cannot be met.

SUMMARY OF THE INVENTION

It is the object of the present invention to increase the functional safety of a transmitter or evaluation system in a circuit of the generic type here to at least Stage SIL 2, by assuring that the current flowing in the current loop, which is made correspondingly available to the downstream device as a value for the measurement variable, corresponds with suitably high probability to either the actual value of the measurement variable to be represented, or to an fault value defined by NAMUR.

This object is attained with the characteristics of claim 1.

A fundamental concept of the invention is considered to be splitting up the measurement resistor for determining the value of the loop current into at least two individual measurement resistors and the pickup of the read-back signal between these individual resistors. That is, if one of the individual resistors changes its value (for instance from a breakage or poor contact points), this can be ascertained by the control unit, since the read-back voltage now no longer fits the predetermined voltage corresponding to the loop current to be generated.

It is especially advantageous that with the principle according to the invention, depending on the intended use, a selective operating mode of the transmitter as a current sink or current source can be effected either alternatively or cumulatively, and that by simple structural expansions the HART specifications and explosion protection can be met by means of intrinsic safety.

Corresponding embodiments can be learned from the dependent claims.

BRIEF DESCRIPTION OF THE DRAWINGS

A plurality of exemplary embodiments of the drawing will be described in further detail below in conjunction with FIGS. 1-10. Shown are.

DESCRIPTION OF THE EXEMPLARY EMBODIMENTS

Figure 1:
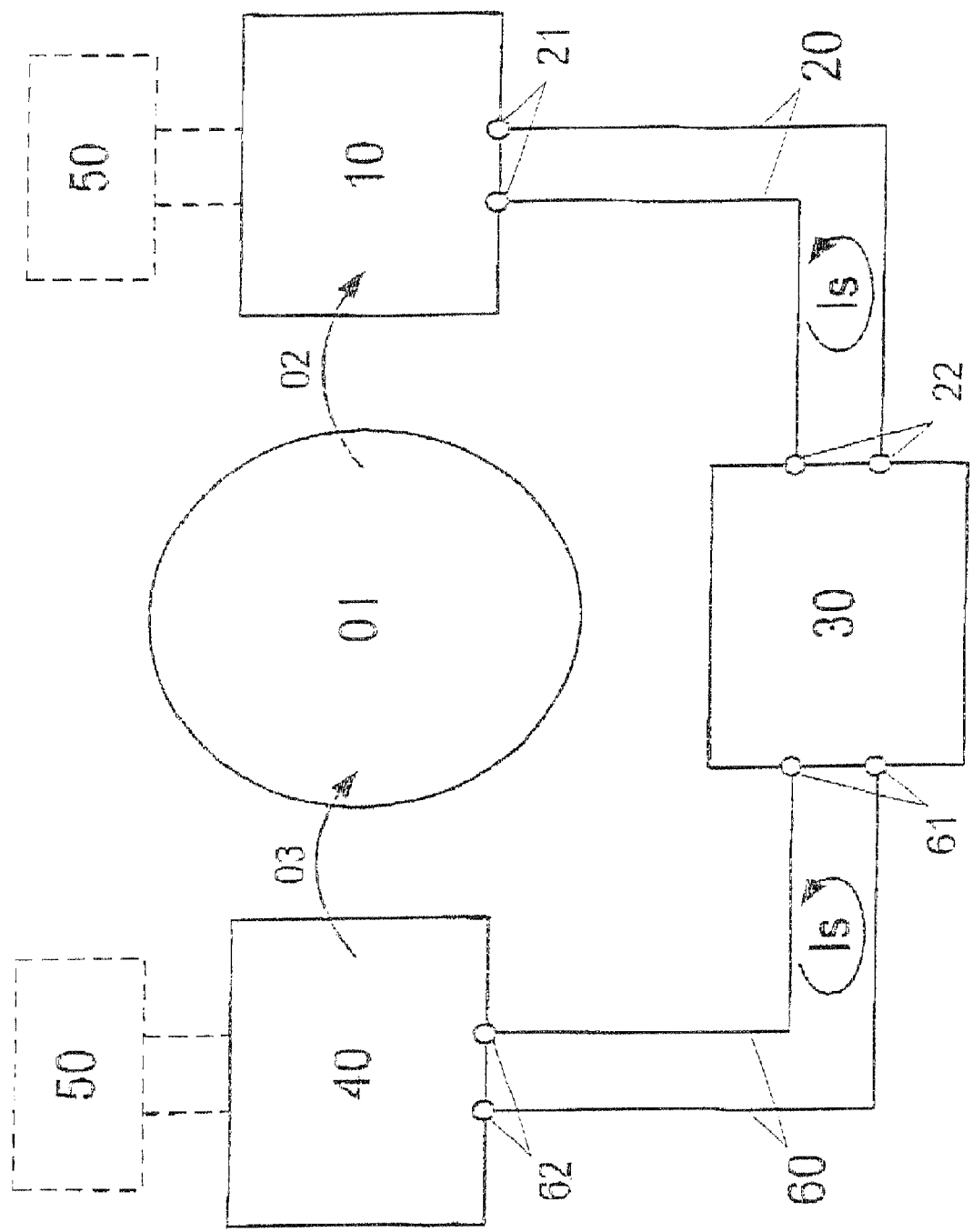
FIG. 1: A block circuit diagram of an industrial processing closed control loop.

FIG. 1, first, shows a typical example of use in processing control technology, in which physical and technical variables are transmitted between various systems by means of analog electrical signals. In this example, for regulating a technical process 01 (such as a chemical reaction in a reactor), the control system 30 must at all times know the value of a physical variable 02 (such as fill level, temperature, pressure, etc.) of the process 01 and keep it within predetermined limits. To that end, the physical variable 02 is detected by a transmitter 10 and converted into an analog electrical signal, which is made available as a loop current signal Is to the current loop 20 via the terminals 21 and is acquired by the control system 30 via the terminals 22. The transmitter may additionally be supplied with auxiliary energy via an external current supply 50.

Via a different current signal Is, which the control system 30 makes available to a further current loop 60 via the terminals 61, the control system 30 can act via a final control element (also called an actuator) 40 (such as a valve, heater, agitator, and so forth) on the variable 03 (such as flow rate, heating current, and so forth) that influences the process. Once again, the actuator can be supplied with auxiliary energy via an external supply 50. More-complicated systems can certainly acquire more than one variable 02 via a multiplicity of transmitters 10 and current loops 20 and can influence the process via a plurality of actuators 40 and current loops 60.

Figure 2:
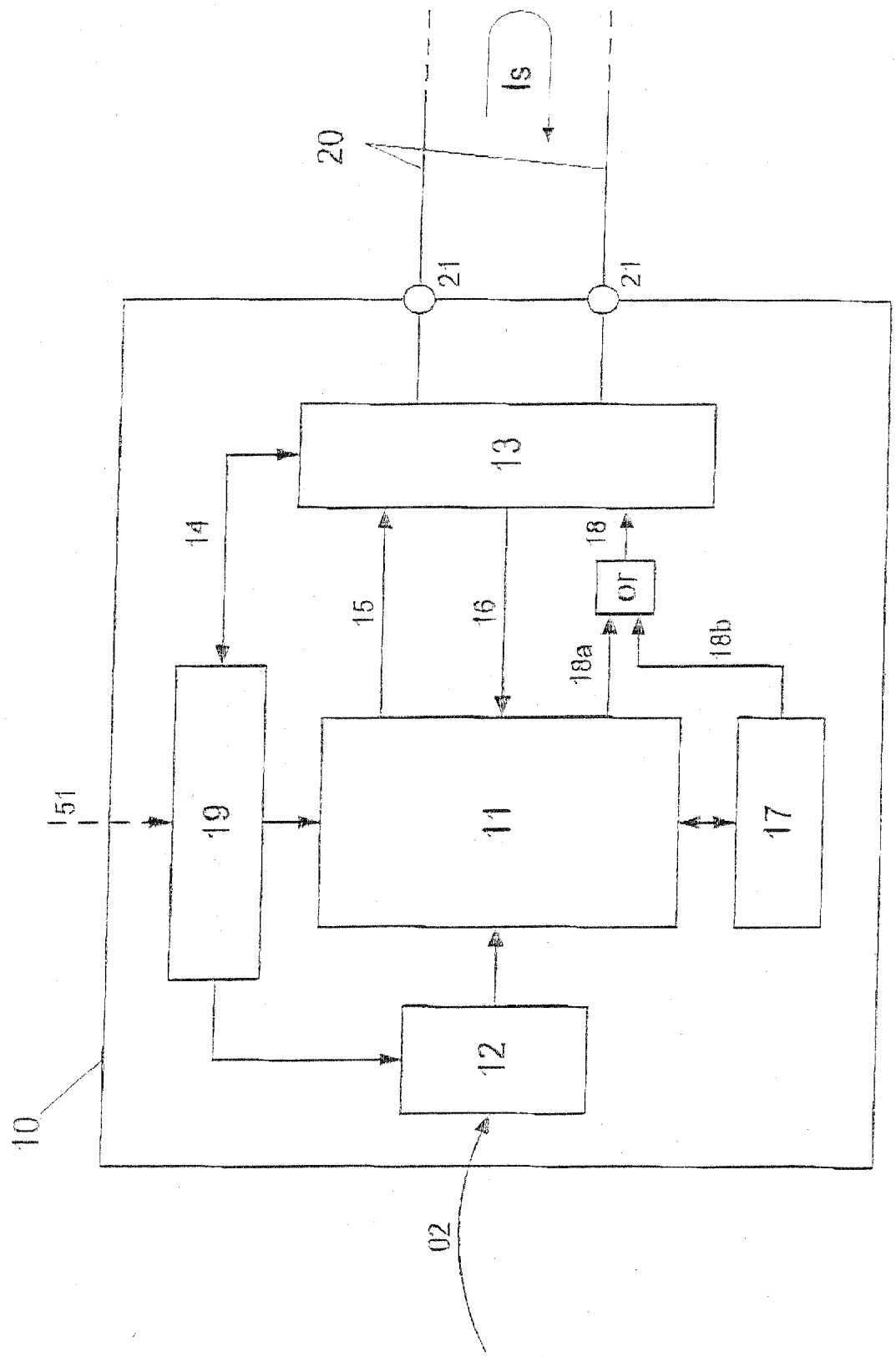
FIG. 2: A block circuit diagram of a field device (transmitter)

FIG. 2 schematically shows the typical construction of a transmitter 10. The variable 02 is detected by a sensor element 12, which in a suitable way (for instance conversion into an electrical signal with ensuing analog-to-digital conversion) makes the variable 02 available to a control unit 11 (such as a microcontroller including peripherals, pulse generation, and memory). The control unit 11 from this, and from its internal parametrizing and calibration values, ascertains the value of the loop current Is that is supposed to flow in the current loop 20 and imparts this value, via a suitable signal 15 (for instance via a control voltage generated by digital-to-analog conversion) to the current output circuit 13. The current output circuit 13 (hereinafter called current output for short) then adjusts the loop current Is in the current loop 20 in accordance with the signal 15. The correct function of the control unit 11 is monitored continuously by a monitoring circuit 17 (watchdog, for example). If the monitoring circuit 17 ascertains a malfunction of the control unit 11, then it can put the current output, independently of the signal 15, into a defined fault state via the signals 18b and 18 (for instance, outputting Is>21 mA via the current loop 20). So that the control unit 11 will know the actual current Is flowing in the current loop 20, this value is made available to the control unit 11 via a suitable signal 16. If the loop current Is actually flowing in the current loop 20 deviates from the value predetermined by the signal 15 by more than one predetermined limit, then the control unit 11, via the signals 18a and 18, can also put the current output in the aforementioned defined fault state. The two signals 18a and 18b are linked in logical OR fashion; that is, either only one of the two signals 18a or 18b, or both signals, must be active so that the signal 18 becomes active ("active" means that the current output 13 is switched such that regardless of the specified value of the signal 15, it signals a fault state in accordance with NAMUR NE043. Only if both signals 18a and 18b are passive does the signal 18 also remain active, and the current output remains in its normal operating state (that is, the loop current Is is determined by the signal 15).

The supply 19 supplies the individual structural units of the transmitter 10 with current. The supply unit 19 can receives its energy either from the current loop 20 (path 14 from current output 13 to supply unit 19) or from an external auxiliary energy supply (path 51). In the latter case, the supply unit 19 can also make the energy for active supply of the current loop 20 available to the current output (path 14 from the supply unit 19 to the current output 13). In the first case, the current output can function only as a passive current sink.

FIG. 2 can be understood in principle in the same way as a block circuit diagram for the process control system 30 (or any other evaluation system). In this case, the sensor element 12 should correspondingly be considered a current input circuit, which in a suitable way makes the current, flowing in a current loop, available to the control unit 11. Instead of a current input, still other input options are conceivable (such as man-machine interfaces, such as keyboards, adjusting regulators, and so forth).

Figure 3:
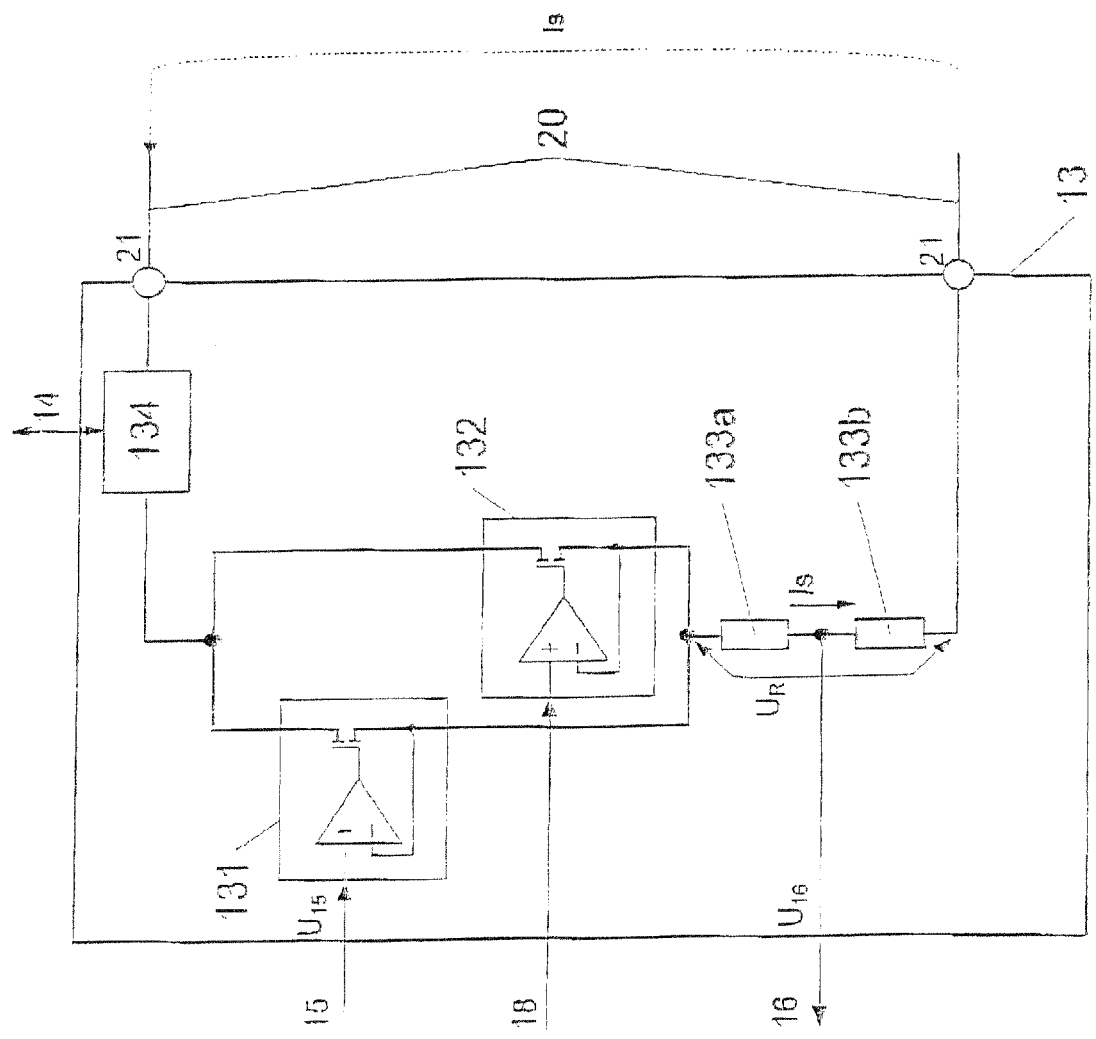
FIG. 3: A block circuit diagram of the current output of the fundamental invention.

In FIG. 3, the current output 13 on which the invention is based is shown in further detail in a schematic overview. The supply unit 134 serves either to supply current to the transmitter 10 (or optionally only parts thereof) from the current loop 20 (operating mode as a passive current sink), or it makes the supply voltage required for operation available to the current loop 20 (active current source).

The loop current Is of the current loop flows via the terminals 21, first via two parallel-connected final control elements 131 and 132, which are both embodied as voltage-controlled current controllers (or current sources) (U. Tietze, Ch. Schenk: *Halbleiter Schaltungstechnik*, 12th Edition, Springer Verlag), and which are both capable independently of one another of adjusting the loop current Is in the current loop 20 based on the control signals 15 and 18. The final control element that seeks to adjust the higher loop current Is in the current loop 20 will dominate in each case. A voltage $U_R(Is) = R_{133} \times Is$ that is proportional to the current in the loop drops at the two resistors 133 (a+b) having the total resistance value $R_{133}$ (hereinafter also called measurement resistance), and this voltage serves as feedback of the actual value to both final control elements. In normal operation, via the final control element 131 and the analog specified voltage 15, the loop current Is in the current loop 20 is adjusted by the control unit 11 in such a way that it represents the variable 02 measured by the sensor unit 12, or in other words is within the range from 4 to 20 mA, or 3.8 to 20.5 mA. If problems that no longer permit safe measurement of the variable 02 are ascertained in the transmitter by the control unit, then via the final control element 131, a loop current <3.6 mA and >21 mA can also be generated, and thus the invalidity of the measured value can be imparted to the evaluation systems connected to the current loop 20.

So that the control unit 11 can be sure that the loop current Is that is actually predetermined by it via the control signal 15 is flowing in the current loop 20, the control unit 11 must be informed of the loop current Is flowing in the current loop 20. To that end, theoretically the same voltage $U_R$, dropping at the resistors 133 and also serving the two final control elements 131 and 132 as an actual value feedback, can be used.

However, this has the grave disadvantage that then all that is monitored is the agreement of the specified value (signal 15) with the expected read-back value (signal 16), not the actual current Is flowing in the current loop 20. That is, if the total resistance 133 changes its value, then the loop current Is in the current loop 20 also changes, without this having been noted by the control unit 11, since the expected value of the read-back voltage $U_{16}$ would after all still agree with the specified voltage $U_{15}$! In that case, the current Is in the current loop 20 would no longer represent the measured variable 02, which in an extreme case can lead to considerable material and personal damage.

A central component of the present invention is therefore the splitting of the measurement resistor 133 into at least two individual resistors (here 133a and 133b) and the pickup of the read-back signal 16 between these individual resistors! If one of the individual resistors (133a or 133b) now changes its value (for instance from breakage or poor contact points), this can be ascertained by the control unit, since the expected feedback voltage $U_{16}$ now no longer fits the specified voltage $U_{15}$. The expected feedback voltage $U_{16}$ is calculated as follows:

$$U_{16} = (U_{15} * R_{133b})/(R_{133a} + R_{133b})$$

In the equation, $R_{133a}$ and $R_{133b}$ are the not necessarily equal resistance values of the individual measurement resistors 133a and 133b, nor need these two necessarily be of the same type (for instance, one may be a thin-film resistor and the other a wire resistor). The splitting of the measurement resistor 133 accordingly leads to the fact that the control unit can also monitor the functional capacity of the measurement resistor itself. Splitting the measurement resistor 133 into more than two individual resistors and feeding back more than read-back signal 16 is equally possible but does not lead to substantially improved detection of problems in the measurement resistor.

What are not detected by this provision are changes and drifting that affect both resistors to the same extent (such as thermal drift). However, this can be reduced to an amount that is unobjectionable by using precision resistors with little temperature- and aging-related drift and by using different types of resistor for the individual resistors.

If an overly large deviation in the expected read-back signal from the actual read-back signal is ascertained by the control unit 11, then the control unit 11 must assume that either there is a fault somewhere in the path from the specified signal 15 via the final control element 131, the measurement resistors 133, and the read-back signal 16, and the correct current Is, corresponding to the measured variable 02, in the current loop 20 can no longer be correctly adjusted via the final control element 131, or that a fault in the external current loop (such as overly high external resistances, such as transition resistors at corroded contacts) is preventing the correct adjustment of the correct current. In that case, the control unit 11 will first attempt to adjust the fault current (per NAMUR) intended by the user by means of the first final control element 131. If this was a current >21 mA and the adjustment was also unsuccessful, then the control unit 11 will next attempt to adjust a fault current of <3.6 mA. If the fault source was an overly high external resistance in the current loop, for instance, then the adjustment of a low fault current (Is<3.6 mA) will function without problems. Only if this fails as well does the control unit 11 have to assume an internal fault. In that case, by activating the control signal 18, it can activate the second final control element 132 to output a fault current. This is configured such that in every case, it causes a fixed loop current Is>21 mA to flow in the current loop 20, and thus signals the failure of the transmitter to the downstream evaluation systems.

Figure 4:
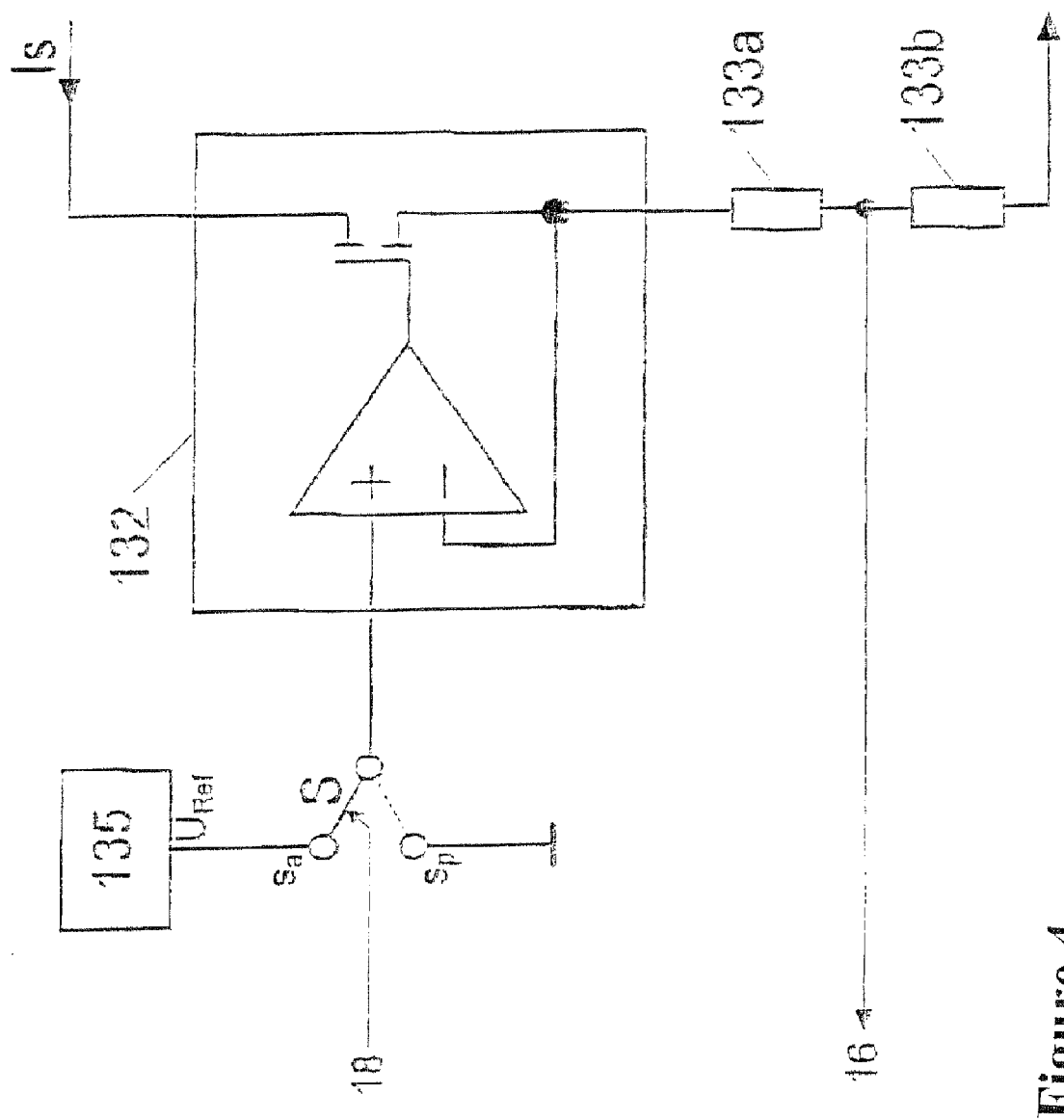
FIG. 4: A schematic illustration of the switchover of the second final control element to a fixed output current.

In FIG. 4, it is shown how the second final control element 132 can be switched to a fixed fault current by means of the signal 18. The signal 18 switches a switch S over between the positions $S_a$ and $S_p$. If the signal 18 is active, then the switch S in the position $S_a$, and a voltage $U_{Ref}$ generated by a voltage source is applied to the final control element 132, this voltage being dimensioned precisely such that $U_{Ref}=Is\times(R_{133a}+R_{133b})$; Is corresponds to the desired fault current (for instance, Is=24 mA). If the signal 18 is passive, then the switch S is in the position $S_p$, and a voltage that allows no current, or only a very slight current, Is (<<3.6 mA) to flow is applied to the final control element 132.

In an advantageous embodiment, the value of the fault current of the second final control element can be selected, for instance at 24 mA, so that it differs from the "high-current" value of the first final control element of 22 mA, for instance. This may be useful under some circumstances in searching for the fault.

A further precondition for the current value read back via the signal 16 corresponding to the actual loop current Is in the current loop 20 is that the entire current Is of the current loop 20 also flows fully through the measurement resistors 133. In the case of two-conductor devices, this can easily be attained by providing either that the entire electronic system of the device is constructed in potential-free (or ground-free) fashion, or that the supply to the current loop and the current input circuits of the evaluation systems are potential-free.

Figure 5:
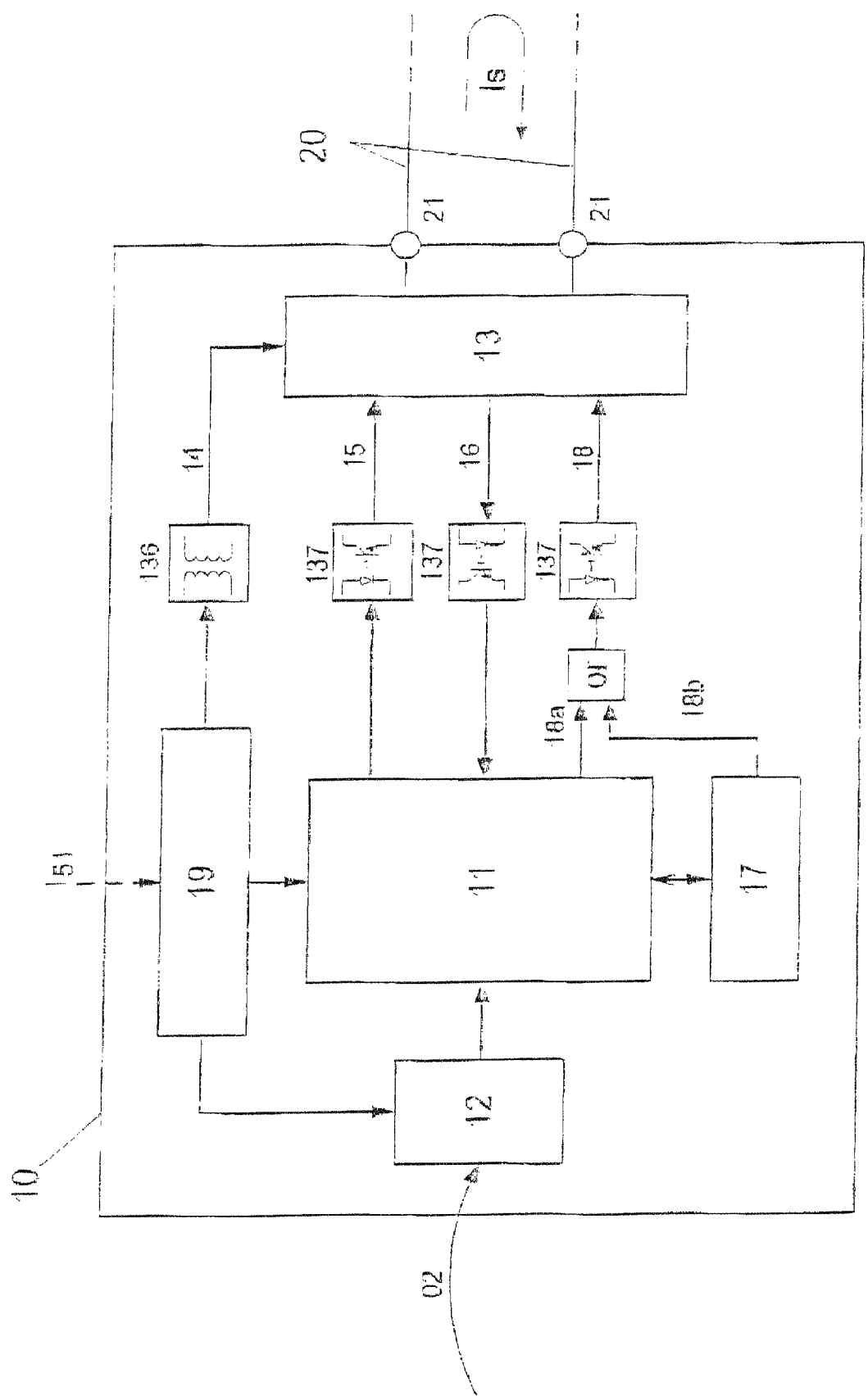
FIG. 5: A block circuit diagram of a 3-conductor or 4-conductor field device with DC separation of the current output.
Figure 6:
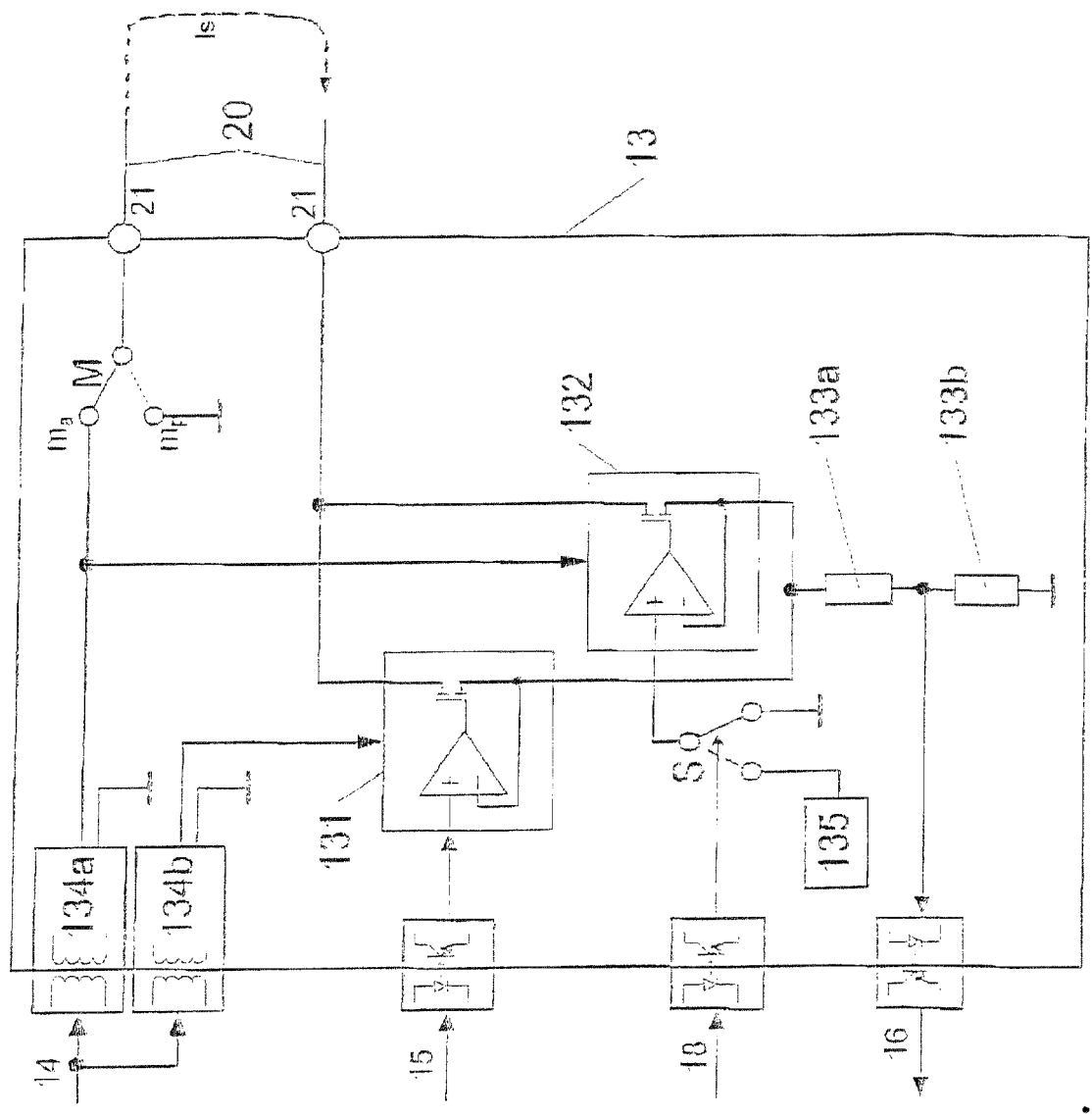
FIG. 6: A block circuit diagram of a 3-conductor or 4-conductor field device with DC separation of the current output and the capability of switchover between the operating modes as a passive current sink and an active current source.

So that in 3-conductor and 4-conductor devices no leakage currents, even in the case of a fault, can flow out via the auxiliary supply or fed in and thus adulterate the current value Is of the current loop that is read back via the signal 16, with these devices a full potential disconnection of the current output from the remainder of the electronics is necessary. For the supply (signal 14), this can be done by suitable DC/DC converters 136, for the control signals 15, 16 and 18, for example by means of suitable optoelectronic coupler circuits 137 (FIG. 5). There may be a plurality of optoelectronic couplers 137 of the signals. Thus for transmitting the analog specified value 15, for example, one sufficiently linear optoelectronic coupler suffices. Instead of the analog specified value, however, the digital control signals of a D/A converter can also be transmitted via optoelectronic couplers. In that case, as a rule a plurality of optoelectronic couplers are needed. The advantage here is that the transmission is not dependent on the linearity of the optoelectronic couplers. The use of a plurality of DC/DC converters is also advantageous. Thus the final control elements 131 and 132 and their trigger circuits, for instance, can supply independently of one another from various DC/DC converters, so that even if one final control element with its supply voltage fails, the function of the other final control element remains assured. This is shown schematically in FIG. 6. Also schematically shown in FIG. 6 is the realization of the switchover of the current output 13 between the operating mode as a passive current sink and the operating mode as an active current source. If the switch (or plug-in jumper) M is in the position ma, then the current output 13 is functioning as an active current source. The supply to the current loop 20 and to the second final control element 132 is done from the DC/DC converter 134a. Both the first final control element 131 and the remainder of the circuit of the current output are supplied from the DC/DC converter 134b. If the switch M is in position $m_p$, then only the second final control element 132 is supplied from the DC/DC converter 134a. In that case, the current loop 20 requires an external voltage source for correct functioning. Care should be taken that the flow of current in the loop always take place in the same direction.

If the supply via the DC/DC converter 134b fails, for instance, then this will be detected by the control unit 11 by comparison of the specified values 15 and read-back values 16, and the control unit can then, via the signal 18, activate the second final control element 132, which together with the current loop 20 and its associated optoelectronic couplers is supplied from the still-functioning DC/DC converter 134a. If on the other hand the DC/DC converter 134a fails, then the control unit 11, via the first final control element 131, can in every case adjust a fault current <3.6 mA in the current loop 20. Thus fault signalling is assured in every case.

For realizing an intrinsically safe current loop, still other provisions are necessary. It must be assured under all circumstances that the explosion-related limit values for voltage, current, and power in the current loop 20 be adhered to (Standard Series EN 60079, especially Part 11). The current and voltage limitation required for this is typically realized in the form of so-called Zener barriers.

Figure 7:
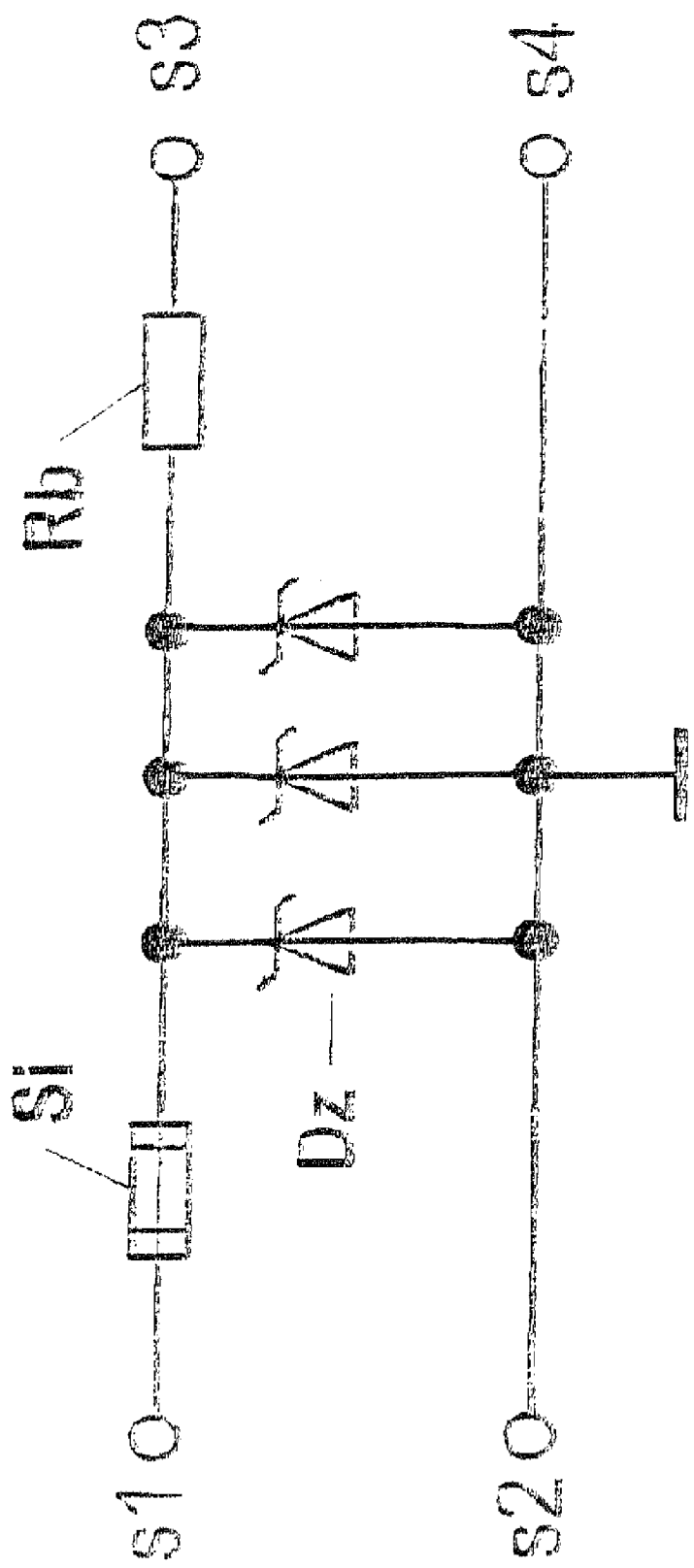
FIG. 7: A schematic illustration of a Zener barrier.

FIG. 7 schematically shows one such Zener barrier. A current circuit that is not intrinsically safe is connected to the terminals s1 and s2. The Zener diodes Dz limit the voltage between the terminals s3 and s4 to their Zener voltages Uz, and the resistor Rb limits the current Is in the current circuit to Is=Uz/Rb. The fuse Si is necessary to protect the Zener diodes Dz against overload (in accordance with the standard, the Zener diodes are not allowed to be loaded beyond a maximum of ⅔ of their limit values). For the resistor, a type with fault prevention must be provided, which cannot fail toward lesser resistances (for instance, thin-film metal film resistor or wire resistor with uncoiling protection). For circuits of protection level ib (see the standard), there must be double Zener diodes, and triple ones for circuits of protection level ia.

Figure 8:
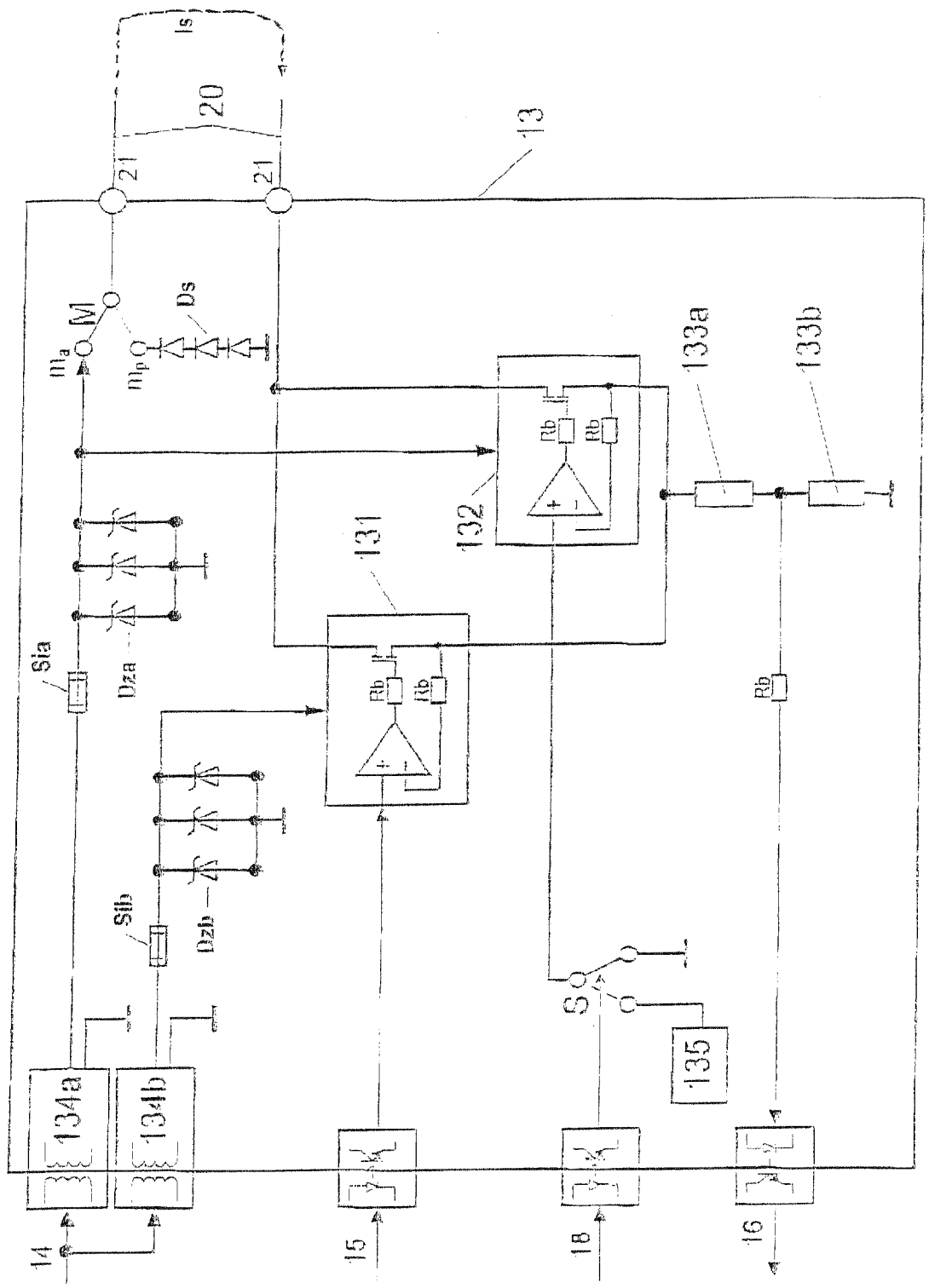
FIG. 8: The current output of FIG. 6, with additional explosion protection provisions.

FIG. 8 shows the integration of the explosion protection provisions of FIG. 7 with the current output of FIG. 6. The voltages of the two DC/DC converters 134a and 134b are limited, not necessarily to the same values, by respective Zener barriers of their own (Sia, Dza and Sib, Dzb). In terms of explosion protection, the higher of the two voltages must be taken into account. Logically, this will be the voltage of the DC/DC converter 134a. An essential characteristic of the present invention is that the two resistors 133a and 133b serve not only to measure the current in the current loop but also at the same time serve as current limiting resistors (Rb in FIG. 7). Accordingly, they must be designed so that they perform both functions. The additional resistors Rb in the final control elements and in the read-back signal 16 must be of sufficiently high impedance that the additional current input into the current loop in the event of fault remains slight. If the operational amplifier and transistors (FETs) in the voltage-controlled current sources 131 and 132 are suitably selected (with input resistors in the gigaohm range), then resistances of more than 100 kiloohms are possible. In the passive current sink operating mode, and in the event of a mispolarized connection of the external current loop, the barrier diodes Ds prevent the currents fed in via the resistors Rb in the event of fault from being added to the external currents and from being taken into account, since because of the barrier diodes, these currents cannot flow in the external current circuit! The barrier diodes Ds must also be present doubly for protection level Ib and triply for the protection level ia.

Figure 9:
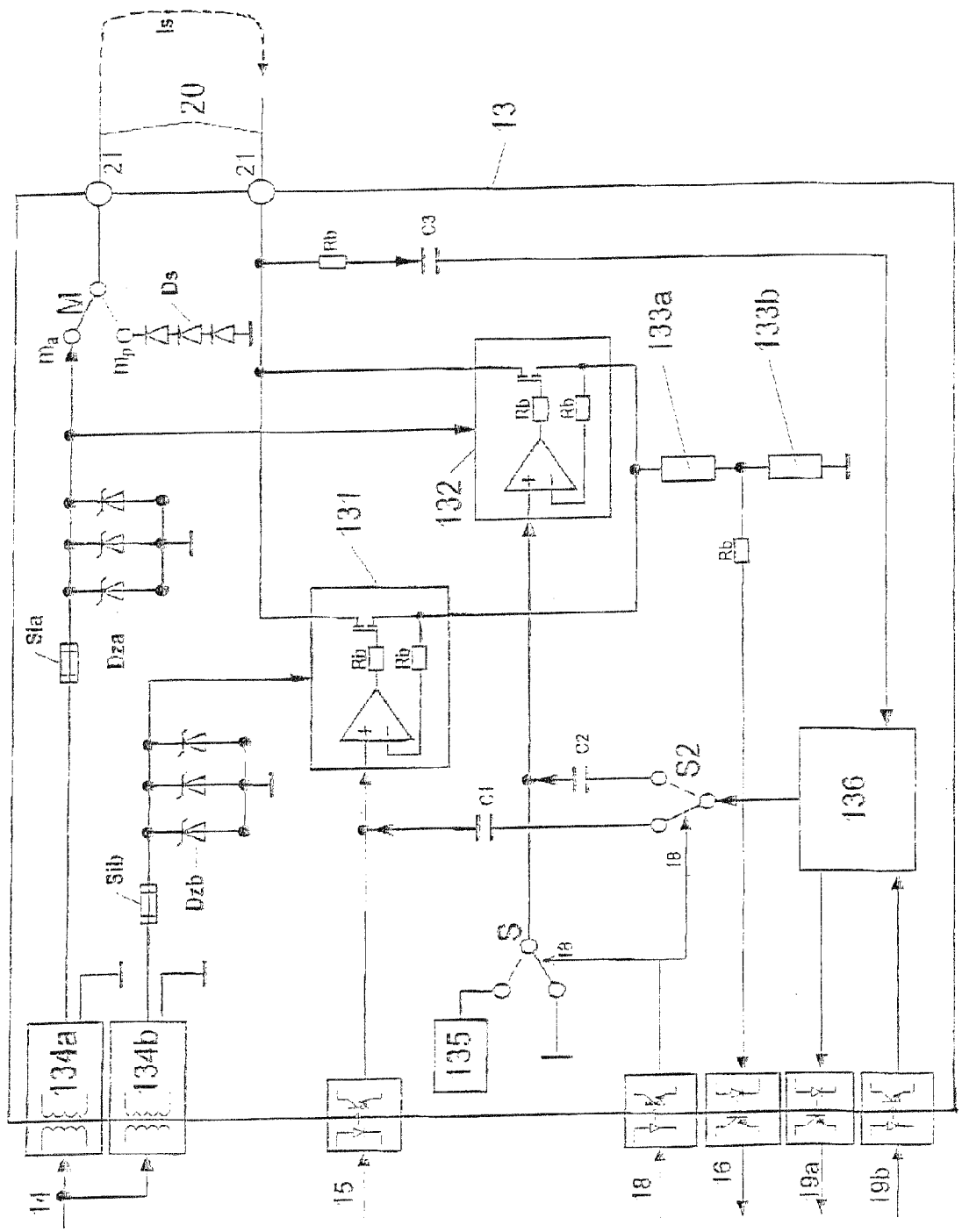
FIG. 9: The current output of FIG. 8 with additional HART communication.

Finally, FIG. 9 also shows the integration of the HART communication with the current output 13. A HART modem circuit 136 (for instance, smar HC2012 with associated wiring) serves to receive and superimpose the FSK signals superimposed on the analog, low-frequency current signal (limit frequency 25 Hz). The FSK signals superimposed on the current signal are delivered to the modem via a high-impedance (100 kiloohm) current limiting resistor Rb and an outcoupling capacitor C3 and are forwarded by the modem as a digital signal 19a to the control unit 11 for evaluation (reception path). The transmission signals 19b arriving from the control unit 11 are converted by the modem into FSK signals and, via a further switch S2 controlled by the signal 18, are switched via the capacitors C1 and C2 either to the first final control element 131 or to the second final control element 132 and there superimposed on the quasi-steady-state control signal. By the switchover of the HART transmission signal to whichever final control element is active, it is attained that even upon activation of the second final control element 132, HART communication is still possible, and thus diagnostic information of the transistor is accessible.

Figure 10:
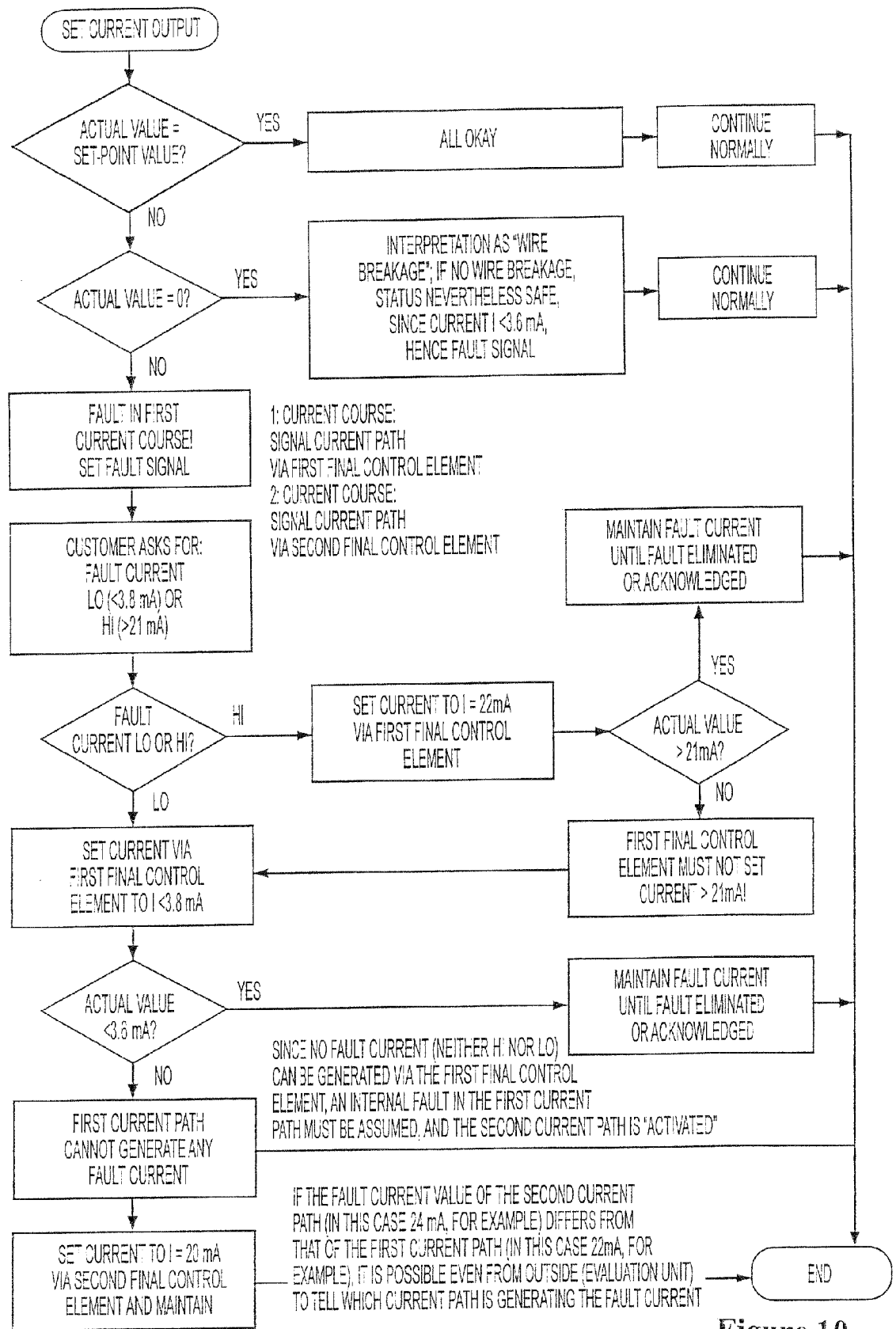
FIG. 10: A flow chart of the fault signalling.

FIG. 10 is a schematic flow chart, which assures that in the case of a fault, a fault current that meets the NAMUR recommendation NE043 will always flow in the current loop.

The invention claimed is:

1. A circuit for safe forwarding of a physical or technical variable between at least two systems in communication with one another, which variable is represented by the value of a loop current (Is), which is adjusted by a control unit (11) by means of a current output circuit (13) in a current loop (20, 60), characterized in that the current output circuit (13) has at least two parallel-connected final control elements (131, 132), controllable by the control circuit (11), as current sources for mutually independent adjustment of a value of the loop current (Is); that the final control elements (131, 132) are in series with at least two likewise series-connected measurement resistors (133a, 133b); that the voltage, proportional to the loop current (Is), dropping via at least one but not all of the at least two measurement resistors is fed back to the control unit (11), which compares the value of this voltage with the corresponding value of the loop current, which value is specified to at least one of the final control elements, and in the event of deviations, via a predeterminable threshold, allocates an fault value corresponding to the NAMUR recommendation NE043 to the loop current via the first final control element (131), and in the case of failure of the first final control element (131) via the second final control element (132); and that a monitoring circuit (17) is provided, which in the event of failure of the control unit (11) allocates an fault value that likewise corresponds to the NAMUR recommendation NE043 to the loop current via the second final control element (132).

2. The circuit as defined by claim 1, characterized in that for communicating the fault source in downstream circuits, the fault values corresponding to the NAMUR standard that are allocated in the event of fault to the loop current (Is) are different for each final control element.

3. The circuit as defined by claim 1, characterized in that each final control element (131, 132) has its own internal electrical power supply (134a, 134b).

4. The circuit as defined by claim 1, characterized in that via a switchover device, the electrical power supply of the current loop can be switched over between an internal electrical power source (134a, 134b) for operation of the current output circuit (13) as an active current source and an external electrical power source for operation as a passive current sink.

5. The circuit as defined by claim 4, characterized in that all the internally generated voltages (voltage sources 134a, 134b) are each defined by respective Zener barriers (Sia, Dza: Sib. Dzb) of their own to a respective limit value; and that additional, high-impedance resistors (Rb) are provided in the final control elements (131, 132), which resistors together with the at least two measurement resistors (133a, 133b) serve as a current limiting resistor, in which case three series-connected diodes (Ds) prevent a current addition of the internal and external electrical power sources.

6. The circuit as defined by claim 1, characterized in that a HART modem circuit (136) is connected to the current output circuit (13), and its output signal is switched to whichever of the two final control elements (131, 132) is active.

* * * * *